Figure 1:
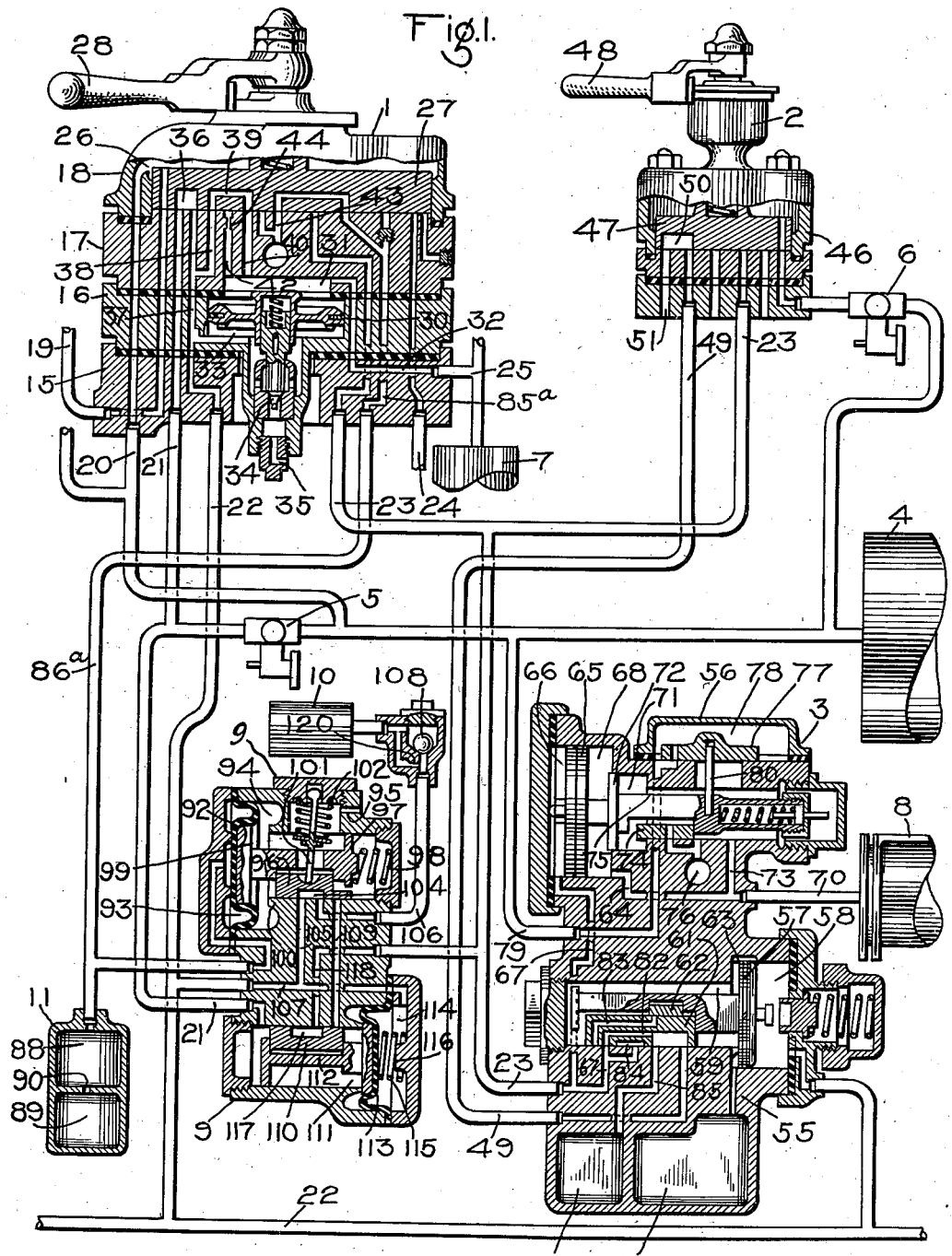

April 14, 1942. C. C. FARMER 2,279,392
LOCOMOTIVE BRAKE CONTROL SYSTEM
Filed Dec. 31, 1940 2 Sheets-Sheet 1

INVENTOR
CLYDE C. FARMER
BY
ATTORNEY

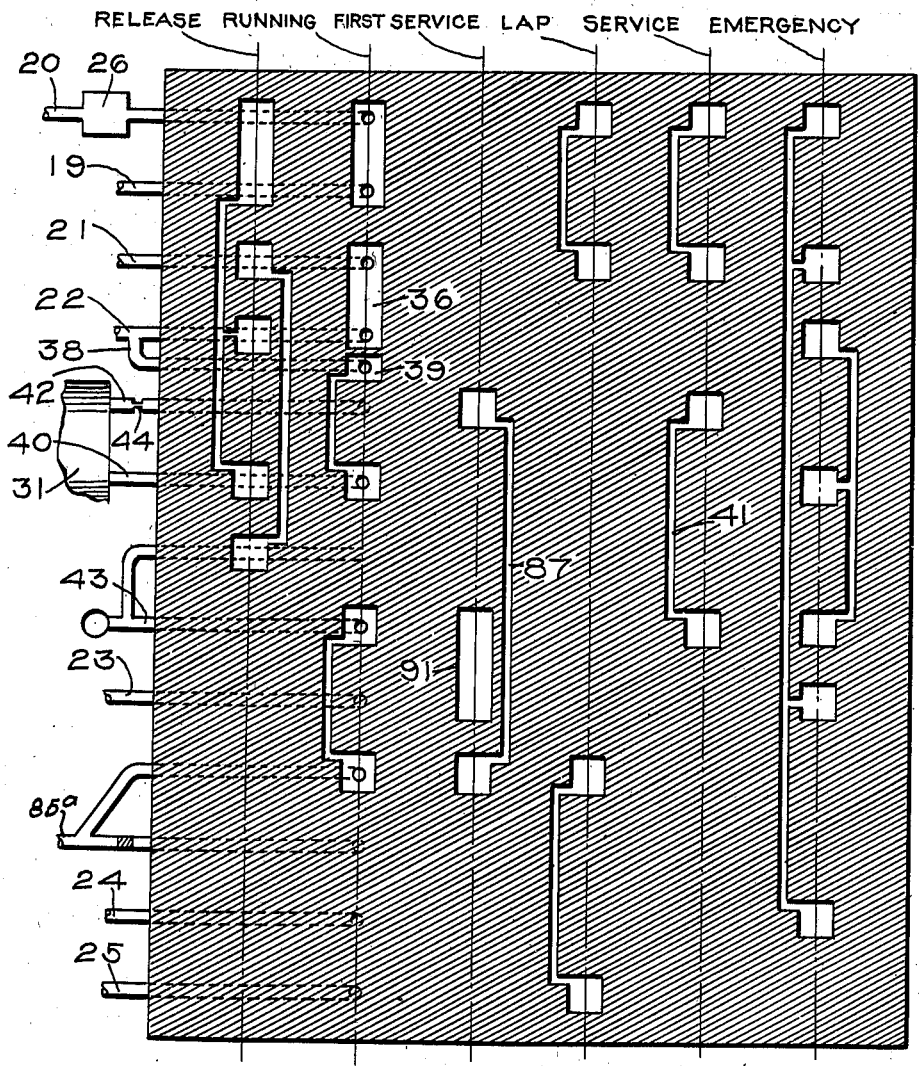

Patented Apr. 14, 1942

2,279,392

UNITED STATES PATENT OFFICE 2,279,392

LOCOMOTIVE BRAKE CONTROL SYSTEM

Clyde C. Farmer, Pittsburgh, Pa., assignor to The Westinghouse Air Brake Company, Wilmerding, Pa., a corporation of Pennsylvania Application December 31, 1940, Serial No. 372,438

14 Claims. (Cl. 303—40)

This invention relates to fluid pressure brakes and more particularly to the type used on locomotives.

In the usual automatic field pressure brake system the brakes on a train are applied by operating the engineer's automatic brake valve device on the locomotive to effect a reduction in brake pipe pressure. A reduction in brake pipe pressure is initially effective at the head end of the train and travels serially to the rear of the train so that the brakes on the head of the train apply first and this tends to cause the slack in the train to run-in against the locomotive. Under certain conditions and particularly on long freight trains this running-in or gathering of slack may be so severe as to result in the development of damaging shocks within the train.

One object of the invention is the provision of an improved locomotive brake equipment embodying means for delaying the application of the brakes on the locomotive with respect to the application of brakes on the cars of a train so that the inertia of the locomotive which tends to keep the slack in the train stretched out, may retard the gathering of such slack by the application of the car brakes.

Another object of the invention is the attainment of these improvements in the well known No. 6-ET locomotive brake equipment with but slight modifications thereof and additions thereto.

These improvements are attained in the No. 6-ET locomotive brake equipment, which has been standard on American railroads for years, merely by modifying only the engineer's automatic brake valve device and by the addition to said equipment of a relatively simple delay valve device. The modification in the automatic brake valve device consists in converting the holding position of the brake valve device to a first service position and eliminating such connections in the brake valve device as were pertinent to such holding position. The passage in the brake valve device heretofore connected through the independent brake valve device of the equipment to the distributing valve release pipe is, in accordance with the invention, disconnected from said pipe and connected to a reduction limiting reservoir, the brake valve device in the first service position being arranged to connect the equalizing reservoir to said reduction limiting reservoir so as to thereby provide for a limited reduction in brake pipe pressure in the first service position for applying the brakes on the cars of a train to a limited degree, such as required for causing a gentle running-in of the slack in the train.

The brake valve device is further modified so as to open the usual application cylinder pipe to atmosphere in the first service position of the brake valve device so as to thereby maintain the brakes on the locomotive released in this position. By the use of first service position of the brake valve device the brakes on the cars of a train will thus be caused to apply to a limited, light degree while holding the brakes on the locomotive released, so that the inertia of the locomotive may be effective to retard the gathering of slack in the train due to the light application of car brakes. The usual service position of the brake valve device is adapted to be employed after the slack in the train is brought under control by the use of the first service position, for applying the brakes on both the locomotive and cars of the train to a greater degree as required to decelerate or stop same, as desired.

Other objects and advantages will be apparent from the following more detailed description of the invention.

In the accompanying drawings; Fig. 1 is a diagrammatic view, mainly in section, of a modified No. 6-ET locomotive brake equipment embodying the invention; and Fig. 2 is a diagrammatic, development view of the rotary valve and seat of the engineer's automatic brake valve device shown in Fig. 1.

As shown in the drawings, the locomotive brake equipment comprises an engineer's automatic brake valve device 1, an independent brake valve device 2, a distributing valve device 3, a valve device 4, a feed valve device 5, a reducing valve device 6, an equalizing reservoir 7, and a brake cylinder device 8. All of the parts of the equipment just enumerated may be identical to corresponding parts of the well known No. 6-ET locomotive brake equipment except the automatic brake valve device 1 which will be presently described. There is added to this well known locomotive brake equipment in accordance with the invention a delay valve device 9, a compensating reservoir 10, and a reduction limiting reservoir 11.

The automatic brake valve device 1 may be the same as heretofore employed in the No. 6-ET locomotive brake equipment except that the holding position between running and lap positions is converted into a first service position and the functions of the holding position are eliminated. This brake valve device therefore comprises the usual casing sections 15, 16 and 17 mounted one on top of the other in the order named and a cover section 18 mounted on the section 17, said sections all being rigidly secured together in the usual manner.

The casing section 15 of the brake valve device constitutes the usual pipe bracket to which is connected the following pipes: pipe 19 which leads to the usual steam compressor governor (not shown) of the equipment; pipe 20 which is connected to the main reservoir 4 and therefore constantly supplied with fluid at main reservoir pressure; pipe 21 connected to the feed valve device 5 and constantly charged with fluid at the pressure supplied by said feed valve device; brake pipe 22; the usual application cylinder pipe 23; sanding pipe 24; and pipe 25 connected to the equalizing reservoir 7. All of these pipes are the same as in the No. 6–ET locomotive brake equipment.

The cover section 18 of the brake valve device has the usual chamber 26 containing a rotary valve 27 which is mounted on a seat provided on the adjacent end face of the casing section 17. The rotary valve 27 is operatively connected to the usual handle 28 through the medium of which the engineer of the locomotive is adapted to turn the rotary valve to the usual release, running, lap, service and emergency positions.

In casing section 16 is mounted the usual equalizing discharge valve mechanism comprising an equalizing piston 30 having at one side a chamber 31 connected by a passage 32 to pipe 25 leading to the equalizing reservoir 7. At the opposite side of the equalizing piston is a chamber 33 open to the brake pipe 22 and containing a brake pipe discharge valve 34 operative by the piston 30 to control communication between said chamber and thereby the brake pipe and the usual atmospheric vent passage 35.

In the running position of brake valve handle 28 and rotary valve 27 shown in Fig. 1, a cavity 36 in the rotary valve establishes communication between the feed valve pipe 21 and a passage 37 leading to the equalizing piston chamber 33 and to brake pipe 22 through which said chamber and brake pipe are adapted to be charged with fluid under pressure in the usual manner for releasing the brakes on the locomotive and the cars of a train. Fluid under pressure supplied to passage 37 also flows through a branch 38 to the seat of the rotary valve. A cavity 39 in the rotary valve connects the passage 38 to a passage 40 to thereby supply fluid under pressure to the equalizing piston chamber 31 and thence through passage 32 and pipe 25 to the equalizing reservoir 7 whereby said chamber and reservoir will also be charged with fluid at the same pressure as supplied to the brake pipe 22. With the brake valve device in running position, chambers 31 and 33 of the opposite sides of the equalizing piston 30 will thus both become charged with fluid at the same pressure and said piston will maintain the brake pipe discharge valve 34 seated as shown in Fig. 1.

In the usual service position of rotary valve 27 and handle 28 communication between the feed valve pipe 21 and brake pipe 22 is closed as well as communication between passages 38 and 40, and a cavity 41, shown in Fig. 2, connects the usual preliminary exhaust passage 42 in the brake valve device to an atmospheric exhaust passage 43 for thereby venting fluid under pressure from the equalizing piston chamber 31 and equalizing reservoir 7 at the usual service rate determined by a choke 44 in passage 42. When the equalizing reservoir pressure in chamber 31 is thus reduced to below brake pipe pressure acting on the opposite side of piston 30 in chamber 33, the higher brake pipe pressure is adapted to move said piston in an upwardly direction for thereby pulling the brake pipe discharge valve 34 away from its seat to permit fluid under pressure to be vented from the equalizing piston chamber 33 and thereby from the brake pipe 22 at a rate and to a degree depending upon the rate and degree of reduction in equalizing reservoir pressure in chamber 31.

When the equalizing reservoir pressure in chamber 31 is reduced as just described to a degree which will provide a desired reduction in pressure in the brake pipe 22 and thereby a desired application of brakes on a train, the rotary valve 27 is adapted to be turned to the usual lap position for closing communication between the equalizing piston chamber 31 and the exhaust passage 43 to thereby prevent further reduction in equalizing reservoir pressure. When the brake pipe pressure acting in the equalizing piston chamber 33 then becomes reduced to substantially the same degree as equalizing reservoir pressure in chamber 31, the equalizing piston 30 operates to seat the discharge valve 34 to prevent further venting of fluid under pressure from the brake pipe 22.

The independent brake valve device 2 is the same as that employed in the No. 6–ET locomotive brake equipment and comprises a casing 46 containing a rotary valve 47 which is operatively connected to a handle 48 for movement to its usual locomotive brake controlling position. The application cylinder pipe 23 is connected to the independent brake valve device as well as the usual distributing valve release pipe 49. The rotary valve 47 is shown in its usual running position in which a cavity 50 therein establishes communication between the release pipe 49 and an exhaust passage 51. The operation of the invention is independent of this brake valve device and a further description thereof is therefore not deemed essential.

The distributing valve device 3 comprises the usual equalizing portion 55 and application portion 56.

The equalizing portion of the distributing valve device comprises an equalizing piston 57 having at one side a chamber 58 in constant communication with brake pipe 22 and having at the opposite side a valve chamber 59 which is always open to a pressure chamber 60. The valve chamber 59 contains the usual main slide valve 61 and auxiliary slide valve 62 which are connected to the piston 67 for operation thereby.

The application portion 56 of the distributing valve device comprises an application piston 65 having at one side a chamber 66, commonly known as the application cylinder, which is connected by a passage 67 to the seat of slide valve 61 and to the application cylinder pipe 23. At the opposite side of the application piston 65 is a chamber 68 which is open through a restricted passage 64 to a pipe 70 leading to the brake cylinder device 8. The chamber 68 is separated from a valve chamber 71 by a baffle piston 72 which is connected for movement with the application piston 65. The chamber 71 is in constant communication with the brake cylinder device 8 through a passage 73 and pipe 70 and contains a slide valve 74 which is mounted between spaced shoulders on a stem 75 projecting from the baffle piston 72, said valve being arranged to control communication between the valve chamber and a brake cylinder release passage 76.

The application portion of the distributing valve device, further comprises an application valve 77 which is contained in a chamber 78 constantly supplied with fluid under pressure directly from the main reservoir 4 through a passage and pipe 79. The slide valve 77 is connected by a pin 80 to the piston stem 75 for movement with the application piston 65.

In the normal position of the application portion of the distributing valve device, as shown in Fig. 1, the slide valve 77 closes communication between valve chamber 78 and valve chamber 71, while the release valve 74 opens communication between the valve chamber 71 and the exhaust passage 76, thereby opening the brake cylinder device 8 to the atmosphere to provide for a release of locomotive brakes. This condition is obtained when the application cylinder 66 is void of fluid under pressure.

When fluid under pressure is supplied to the application piston chamber or cylinder 66 as will be hereinafter described, such pressure acting on the application piston 65 is adapted to effect movement thereof in the direction of the right-hand. This movement of the piston 65 is adapted to shift the slide valve 74 on its seat to a position for closing communication between valve chamber 71 and the exhaust passage 76 while the application slide valve 77 is adapted to obtain a position opening communication between chamber 78 and the valve chamber 71. When the latter communication is thus opened, fluid under pressure is adapted to be supplied from the main reservoir 4 through the valve chamber 78 to chamber 71 and thence through passage 73 and pipe 79 to the brake cylinder device 8 for applying the brakes on the locomotive. The pressure of fluid thus obtained in the brake cylinder device is adapted to act through the restricted passage 64 in chamber 68 on the application piston 65 in opposition to the pressure of fluid supplied to the application cylinder 66 and when brake cylinder pressure slightly exceeds that in the application cylinder, said piston is adapted to be moved toward the left-hand to actuate the slide valve 77 to close communication between chambers 78 and 71 so as to cut off further flow of fluid under pressure to the brake cylinder device 8. The application portion of the distributing valve device is thus adapted to supply fluid to the brake cylinder device 8 at a pressure corresponding to that provided in the application cylinder 66 to thereby provide a desired application of the locomotive brakes.

When fluid under pressure is released from the application cylinder 66 in a manner to be later described, brake cylinder pressure in chamber 68 is adapted to effect movement of the application piston 65 and thereby of the application slide valve 77 and exhaust slide valve 74 back to their release positions shown in which the valve chamber 71 and thus the brake cylinder device 8 is placed in communication with the atmospheric exhaust passage 76 so as to release fluid under pressure from said brake cylinder device and thereby release the locomotive brakes.

When the automatic brake valve device 1 is in the running position supplying fluid under pressure from the feed valve device 5 to the brake pipe 22 as hereinbefore described, such pressure acting in the equalizing piston chamber 58 of the distributing valve device is adapted to position the equalizing piston 57 as shown in Fig. 1. In this position of piston 57 a feed groove 63 connects the chamber 58 to the valve chamber 59 so as to supply fluid under pressure from the application piston chamber 58 to the valve chamber 59 and thence to the pressure chamber 60 for charging said valve chamber and pressure chamber with fluid at the pressure obtained in the brake pipe 22. With the equalizing piston 57 and slide valves 61 and 62 in their normal positions just referred to, the application cylinder 66 is open to the atmosphere through passage 67, a cavity 82 in slide valve 61 and the distributing valve release pipe 49 which is connected to the independent brake valve device 2 and open to the atmosphere through cavity 50 in the rotary valve 47, and passage 51 in said brake valve device. Thus while the equalizing portion of the distributing valve device is in its normal position shown, venting the application cylinder 66 of the application portion of said device said application portion will be conditioned to connect the brake cylinder device 8 to the atmosphere as before described for releasing the brakes on the locomotive.

When a reduction in pressure in the brake pipe 22 is effected by operation of the brake valve device 1 to the usual service position, such reduction in equalizing piston chamber 58 of the distributing valve device permits the pressure of fluid in valve chamber 59 to move the piston 57 and thereby the slide valves 61 and 62 to their usual service positions in which a service port 83 in the main slide valve is uncovered by the auxiliary slide valve 62 and registers with the passage 67. In this position of the main slide valve the passage 67 is also connected by a cavity 84 in said valve to a passage 85 which leads to an application chamber 86. With the parts thus positioned fluid under pressure is adapted to flow from valve chamber 59 and thereby pressure chamber 60 to passage 67 and thence to the application chamber 86 and the connected application cylinder 66 for thereby operating the application portion of the distributing valve device to apply the brakes on the locomotive to a degree dependent upon the pressure of fluid supplied to the application cylinder 66 and chamber 86.

Fluid under pressure will flow from the valve chamber 59 and pressure chamber 60 to the application chamber 86 and application cylinder 66 until the pressure of fluid in said valve chamber acting on the equalizing piston 57 becomes reduced to a degree slightly less than brake pipe pressure in chamber 58, at which time the differential of pressures obtained on the equalizing piston 57 will effect movement thereof and thereby of the auxiliary slide valve 62 relative to the main slide valve 61 to a position lapping the service port 83 to thereby limit the pressure of fluid obtained in the application cylinder 66 and chamber 86 to a degree dependent upon the reduction in pressure in brake pipe 22.

The distributing valve device 3 is thus operative in accordance with the reduction in pressure in brake pipe 22 obtained by movement of a brake valve device to the usual service and lap positions, to provide a corresponding application of locomotive brakes.

When the automatic brake valve device 1 is returned to running position subsequent to effecting a reduction in brake pipe pressure, the brake pipe 22 is recharged with fluid under pressure from the feed valve device 5 and the consequent increase in pressure in chamber 58 of the equalizing portion of the distributing valve device moves the parts of said portion to their release position shown for thereby recharging valve chamber 59 and pressure chamber 60 with fluid under pressure and for at the same time placing the application cylinder 66 and application chamber 86 in communication with the release pipe 49 for effecting a release of the locomotive brakes.

The application of brakes on the locomotive in response to a reduction in brake pipe pressure as just described is dependent upon the application cylinder pipe 23 which is at all times in direct communication with the application cylinder 66, being lapped by the rotary valve in both of the brake valve devices. This pipe is lapped in the independent brake valve device when in the normal position shown in which it is adapted to be carried when controlling the brakes on the locomotive and train by operation of the automatic brake valve device 1. The application cylinder pipe 23 is also lapped by rotary valve 27 in the automatic brake valve device 1 in the running, lap, and service positions hereinbefore mentioned, as will be apparent from an inspection of Fig. 2.

The construction and operation of the parts of the locomotive brake equipment as so far described are well known to those skilled in the art and may be identical to corresponding parts of the brake equipment disclosed in Instruction Pamphlet No. 5032 issued by The Westinghouse Air Brake Company in November, 1932, and entitled No. 6-ET Locomotive Brake Equipment. Since reference may be had to this instruction pamphlet, a more detailed description of these parts of the brake equipment is therefore not deemed essential to a comprehensive understanding of the invention.

In the well known No. 6-ET locomotive brake equipment disclosed in the pamphlet just referred to, the distributing valve release pipe passage in the independent brake valve device, indicated in Fig. 1 by the reference numeral 51, is connected by a pipe, commonly known as the U pipe, to a release passage, indicated in Fig. 1 by reference numeral 85a, in the automatic brake valve device. In accordance with the invention this U pipe is dispensed with and the release passage 85a in the automatic brake valve device is connected by a pipe 86a to the reduction limiting reservoir 11, which has been added to the equipment.

As before mentioned, the holding position heretofore provided in the automatic brake valve device of the No. 6-ET locomotive brake equipment has been converted in accordance with the invention into a first service position as indicated in Fig. 2. The rotary valve 27 in the brake valve device 1 is provided with a new cavity 87, shown in Fig. 2, which in the first service position connects the preliminary exhaust passage 42 to passage 85a communicating with the reduction reservoir 11. Thus when the brake valve device is moved to first service position, a reduction in pressure in the equalizing piston chamber 31 and equalizing reservoir 7 is adapted to occur into the reduction limiting reservoir 11 for effecting operation of the equalizing piston 30 to open the brake pipe discharge valve 34 to effect a reduction in brake pipe pressure.

The reduction limiting reservoir 11 has two reduction chambers 88 and 89 connected together by a restricted port 90 having less flow capacity than the preliminary exhaust choke 44 in the automatic brake valve device. The chamber 88 is in direct communication with pipe 86a and is of such volume as to provide a limited reduction, such as six pounds, in pressure in the equalizing piston chamber 31 and equalizing reservoir 7 at the usual service rate through the preliminary exhaust choke 44. The reduction in equalizing reservoir pressure is limited to this degree so that the corresponding reduction in pressure in the brake pipe 22 will cause the usual serial, quick service action of the brake controlling valve devices (not shown) on the cars of a train to thereby promptly initiate an application of brakes on said cars. After substantial equalization of the pressures in the equalizing reservoir 7 and in the reduction chamber 88, the pressure of fluid in said reservoirs continues to reduce at a slower rate through choke 90 to equalization into the reduction chamber 89, the volume of which is such as to limit the reduction in pressure in the equalizing reservoir 7 and thereby in the brake pipe 22 to a degree, such as eight pounds, which is sufficient to cause the brake controlling valve devices on the cars of the train to apply the brakes with such force as to cause a gentle running-in of the slack in the train toward the locomotive.

In first service position of the automatic brake valve device a cavity 91 in the rotary valve connects the application cylinder pipe 23 to the atmospheric passage 43 so that fluid under pressure supplied to the application cylinder passage 67 in the distributing valve device upon operation thereof in response to the limited reduction in pressure in brake pipe 22, is vented to the atmosphere whereby the application portion of the distributing valve device remains in its brake release position shown.

It will now be evident that in first service position of the automatic brake valve device 1 a limited reduction in brake pipe pressure is effected to cause a limited degree of brake application on the cars of a train and at the same time the brakes on the locomotive are held released, so that the inertia of the locomotive tending to keep the slack in the train stretched out may thus retard the gathering of such slack by the light limited application of brakes on the cars of the train.

It is intended that the brake valve device 1 be maintained in first service position only for a period of time sufficient to insure the gentle gathering of slack in the train and then be moved to the usual service position for effecting a further reduction in brake pipe pressure, as before described, to provide for the application of brakes on both the cars and locomotive to a degree which will provide a desired deceleration or stopping of the train, it being noted that in service position of the brake valve device communication between the application cylinder pipe 23 and the exhaust port 43 in the brake valve is closed.

In the usual distributing valve device employed in connection with the No. 6-ET locomotive brake equipment, the volumes of the pressure chamber 60 and application chamber 86 are so related that for each pound reduction in pressure in the brake pipe and thereby in the pressure chamber 60 two and one-half pounds pressure will be obtained in the application chamber 86 and thereby in the application cylinder 66 to provide a like pressure in the locomotive brake cylinder device to apply the locomotive brakes. A full service reduction in brake pipe pressure of twenty pounds from a normal pressure of seventy pounds will therefore provide fifty pounds pressure in the application chamber 86 and application cylinder 66 and a like pressure in the locomotive brake cylinder device 8 which is the same pressure as obtained in the brake cylinder device on cars of a train for the same full service reduction in brake pipe pressure.

While effecting the first service reduction, of say eight pounds, in brake pipe pressure as above described, the equalizing portion 55 of the distributing valve device supplies fluid from the pressure chamber 60 to passage 67 which in the usual No. 6-ET brake equipment would provide twenty pounds pressure in the application chamber 86, application cylinder 66 and thereby in the locomotive brake cylinder device 8. In accordance with the invention this fluid under pressure supplied from the pressure chamber 60 while effecting the first stage of reduction in brake pipe pressure is dissipated through the automatic brake valve device 1 in first service position in order that the locomotive brakes will not apply during the slack gathering period. It is however desired that the fluid under pressure thus dissipated be replaced after the slack gathering period in order that the locomotive will be braked to the usual degree and thus provide its share of braking to retard or stop the train. This replacement is automatically accomplished by the delay valve device 9 which will now be described.

The delay valve device 9 comprises a flexible diaphragm 92 having at one side a chamber 93 connected to pipe 86a leading to the reduction reservoir 11 and having at the opposite side a valve chamber 94 which is in constant communication with the atmosphere through a breather port 95. A slide valve 96 contained in valve chamber 94 is operatively connected to the diaphragm 92 for movement therewith by a stem 97. A spring 98 in chamber 94 acts on the stem 97 for urging the slide valve 96 and diaphragm 92 to the position shown. The pressure of this spring is such that upon the initial supply of fluid under pressure to the reduction chamber 88 when the automatic brake valve device 1 is moved to first service position said pressure acting in the diaphragm chamber 93 on the diaphragm 92 will promptly overcome said spring and move the slide valve 96 from its normal position shown to a position defined by engagement of a diaphragm follower 99 on said stem with an annular stop shoulder 100.

In valve chamber 94 is a rocking pin 101 which engages the slide valve 96 in a recess and which is subject to the pressure of a spring 102 for urging the slide valve 96 into contact with its seat at all times.

The slide valve 96 has a cavity 104 which in the normal position of said slide valve shown in Fig. 1 connects a passage 105 to a pipe 106. The passage 105 is connected by a passage 107 to brake pipe 22, while the passage 106 is connected to the compensating reservoir 10 past a check valve 108. Thus with the slide valve 96 in its normal position shown fluid under pressure supplied to the brake pipe 22 is adapted to flow through the passages 107, 105, cavity 104 in said slide valve, passage 106, and past the check valve 108 to the compensating reservoir 10 for charging same with fluid at the same pressure as the brake pipe 22 is charged with when the automatic brake valve device 1 is in running position, hereinbefore described.

When the automatic brake valve device 1 is moved to first service position to initiate an application of brakes on a train the pressure of fluid initially obtained in the pipe 86a leading to the reduction chamber 88 and acting in chamber 93 on the diaphragm 92 is adapted to deflect said diaphragm against spring 98 and thereby move the slide valve 96 from the position shown in the direction of the right hand, as viewed in the drawing to a position defined by contact of follower 99 with shoulder 100. In this right hand position of the slide valve 96, cavity 104 is moved out of registry with passage 105 thereby disconnecting the compensating reservoir 10 from the brake pipe 22 so as to prevent the pressure of fluid in said reservoir reducing with brake pipe pressure. The cavity 104 in slide valve 96 when thus disconnected from passage 105 connects pipe 106 to a passage 109 which leads to the seat of a slide valve 110.

The slide valve 110 is contained in a valve chamber 111 which is constantly supplied with fluid under pressure from the feed valve pipe 21 and is operatively connected by a stem 112 to one side of a flexible diaphragm 113. The diaphragm 113 has at its opposite face a chamber 114 which is in constant communication with brake pipe 22 through the passage 107. A spring 115 in chamber 114 acts on the diaphragm 113 for urging same and thereby the slide valve 110 to their normal positions shown.

The diaphragm 113 is thus subject on one face to feed valve pressure in chamber 111 and on the opposite face to the pressure of spring 115 plus brake pipe pressure in chamber 114, the brake pipe pressure being normally the same as that supplied by the feed valve device to chamber 111. The pressure of the spring 115 is such as to maintain the diaphragm 113 and slide valve 110 in the position shown until after the initial reduction in brake pipe pressure, determined by the combined volumes 88 and 89 of the reduction limiting reservoir 11, has been completed at which time feed valve pressure in chamber 111 is adapted to overcome the opposing brake pipe pressure and pressure of spring in chamber 14 and move the diaphragm and thereby the slide valve 110 from the position shown in the direction of the right-hand to a position determined by engagement between the diaphragm 113 and a stop 116.

Thus when the automatic brake valve device 1 is moved to first service position to effect the initial limited service reduction in pressure in the brake pipe 22 for effecting a light slack gathering application of brakes on the cars of a train, the slide valve 110 is held in the position shown lapping passage 109 until substantial completion of said limited reduction in brake pipe pressure, and then feed valve pressure in chamber 111 will move the diaphragm 113 and slide valve 110 to their right-hand positions above mentioned. At the same time as the slide valve 110 is thus operated it is intended that the engineer shall move the rotary valve 27 in the automatic brake valve device 1 to service position for continuing the service reduction in brake pipe pressure to the desired degree.

When the diaphragm 113 obtains its right-hand position just mentioned, a cavity 117 in slide valve 110 connects passage 109 to a passage 118 leading to the application cylinder pipe 23. The passage 109 at this time is connected to the compensating reservoir 10 through slide valve 96 so that fluid under pressure will now flow from said compensating reservoir to the application cylinder pipe 23 and thereby to the application cylinder 66 and chamber 86 in the distributing valve device and equalize therein to compensate for the fluid pressure supplied from the pressure chamber 60 and dissipated through the application cylinder pipe 23 and automatic brake valve device 1 to the atmosphere when the automatic valve pipe device was in first service position. By thus compensating for the dissipated fluid pressure supplied by the equalizing portion of the distributing valve device from the pressure chamber 60 when the automatic brake valve device 1 was in first service position the further supply of fluid under pressure from pressure chamber 60 obtained with the brake valve device in service position will apply the brakes on the locomotive to substantially the same degree as would be obtained in the usual No. 6–ET locomotive brake equipment where all of the fluid supplied by the equalizing portion of the distributing valve device is effective to operate the application portion 56 thereof.

The check valve 108 between pipe 106 and the compensating reservoir 10 provides for rapid charging of the compensating reservoir from the brake pipe 22 when the parts of the delay valve device 9 are in their normal positions shown but prevents the flow of fluid from said reservoir to pipe 106 through the reservoir charging communication when said reservoir is connected to the application cylinder pipe 23, the flow to said pipe being controlled by a choke 120 by-passing the valve 108. The purpose of choke 120 is to so restrict the flow of fluid under pressure from the compensating reservoir 10 to the application cylinder pipe 23 that the increase in pressure in said pipe and thereby in the application chamber 86 and cylinder 66, due to such flow and the simultaneous supply of fluid under pressure through the service port 83 in the main slide valve 61 from the pressure chamber 60 will not cause such a rapid build up of pressure in the application cylinder 66 and thereby in the brake cylinder device 8 on the locomotive as to cause severe shocks in the train.

The parts of the delay valve device 9 remain in the positions just described until a subsequent release of brakes is effected upon movement of the brake valve device 1 to running position for recharging the brake pipe 22 and for releasing fluid under pressure from the reduction limiting reservoir 11. When the pressure in the brake pipe 22 is thus increased to within a degree such as eight pounds of the pressure of fluid supplied by the feed valve device 5 spring 115 in the delay valve device 9 will deflect diaphragm 113 and thereby move the slide valve 110 back to their normal positions shown. When the pressure of fluid in the reduction limiting reservoir 11 is also reduced to a sufficient degree, spring 98 will return the slide valve 96 and diaphragm 92 to their normal positions shown in which the compensating reservoir 10 will be again connected to the brake pipe 22 so as to be recharged to the pressure in the brake pipe and thus be in condition for a subsequent application of brakes on the train.

*Summary*

It will now be apparent that the benefit of locomotive inertia in connection with the gathering of slack in trains may be obtained by venting the application cylinder pipe of a locomotive brake equipment while effecting a light slack gathering application of the brakes on the cars of a train. Such venting however causes a loss of fluid under pressure which is required to provide the desired degree of braking of the locomotive after the slack gathering period, but this loss is compensated for by connecting a charged compensating reservoir to the application cylinder pipe at the termination of the slack gathering period.

The automatic brake valve device has a first service position for providing automatically a limited slack gathering application of car brakes and for venting the application cylinder pipe. At the termination of the slack gathering period the brake valve device is adapted to be moved to the usual service position for effecting a further application of brakes. In service position the connection with the application cylinder pipe is lapped so that the fluid pressure supplied to said pipe from the compensating reservoir may be effective. The brakes on the locomotive then apply to a degree bearing substantially the same ratio to brake pipe reduction as obtained in the usual 6-ET locomotive brake equipment.

It will further be noted that the invention may readily be incorporated in the well known No. 6-ET locomotive brake equipment merely by a slight modification of the engineer's automatic brake valve device and by the addition to said equipment of the reduction limiting reservoir 10 and of the delay valve device 9, as above described.

While only one embodiment of the invention has been described in detail, it is not the intention to limit the scope of the embodiment or otherwise than by the terms of the appended claims.

Having now described my invention, what I claim as new and desire to secure by Letters Patent, is:

1. In a locomotive fluid pressure brake equipment, in combination, a brake pipe, a communication to which fluid under pressure is adapted to be supplied to effect an application of locomotive brakes to a degree depending upon the pressure of fluid in said communication, valve means operative upon a reduction in brake pipe pressure to supply fluid under pressure to said communication in an amount proportional to the degree of brake pipe reduction, an engineer's brake valve device having two service positions for effecting a service reduction in brake pipe pressure and operative in one of said positions but not in the other to vent fluid under pressure from said communication, reduction limiting means operative in said one service position to automatically limit the reduction in brake pipe pressure effected by said brake valve device to a chosen degree, and means operative at the termination of said chosen degree of reduction in brake pipe pressure to supply fluid under pressure to said communication in an amount to compensate for the fluid vented therefrom by said brake valve device during said chosen reduction in brake pipe pressure.

2. In a locomotive fluid pressure brake equipment, in combination, a brake pipe, a communication to which fluid under pressure is adapted to be supplied to effect an application of locomotive brakes to a degree depending upon the pressure of fluid in said communication, valve means operative upon a reduction in brake pipe pressure to supply fluid under pressure to said communication in an amount proportional to the degree of brake pipe reduction, an engineer's brake valve device having two service positions for effecting a service reduction in brake pipe pressure and operative in one of said positions but not in the other to vent fluid under pressure from said communication, reduction limiting means operative in said one service position to automatically limit the reduction in brake pipe pressure effected by said brake valve device to a chosen degree, and means operative at the termination of said chosen degree of reduction in brake pipe pressure to supply fluid under pressure to said communication in an amount equal to that supplied by said valve means during said chosen reduction in brake pipe pressure.

3. In a locomotive fluid pressure brake equipment, in combination, a brake pipe, a communication to which fluid under pressure is adapted to be supplied to effect an application of locomotive brakes to a degree dependent upon the pressure of fluid in said communication, an engineer's brake valve device movable to a first service position to effect a limited reduction in brake pipe pressure and to vent said communication and movable to another service position to effect an unlimited service reduction in brake pipe pressure and for closing the vent to said communication, valve means operative upon a reduction in brake pipe pressure to supply fluid under pressure to said communication in a quantity proportional to the reduction in brake pipe pressure, and means conditioned to operate at the time of movement of said brake valve device to said other service position to supply fluid under pressure to said communication in a quantity equal to that supplied by said valve means during said limited reduction in brake pipe pressure.

4. In a locomotive fluid pressure brake equipment, in combination, a brake pipe, a communication to which fluid under pressure is adapted to be supplied to effect an application of locomotive brakes to a degree dependent upon the pressure of fluid in said communication, an engineer's brake valve device movable to a first service position to effect a limited reduction in brake pipe pressure and to vent said communication and movable to another service position to effect an unlimited service reduction in brake pipe pressure and for closing the vent to said communication, valve means operative upon a reduction in brake pipe pressure to supply fluid under pressure to said communication in a quantity proportional to the reduction in brake pipe pressure, and means controlled by brake pipe pressure and operative automatically at the termination of said limited reduction in brake pipe pressure to supply fluid under pressure to said communication in a quantity equal to that supplied by said valve means during said limited reduction in brake pipe pressure.

5. In a locomotive fluid pressure brake equipment, in combination, a brake pipe, a communication to which fluid under pressure is adapted to be supplied to effect an application of locomotive brakes to a degree dependent upon the pressure of fluid in said communication, an engineer's brake valve device movable to a first service position to effect a limited reduction in brake pipe pressure and to vent said communication and movable to another service position to effect an unlimited reduction in pressure in said brake pipe and to close the vent to said communication, valve means controlled by the opposing pressures of the brake pipe and a chamber and operative upon a reduction in brake pipe pressure to supply fluid under pressure from said chamber to said communication in a quantity dependent upon the reduction in brake pipe pressure, a reservoir normally charged with fluid under pressure, and valve means operative automatically at the termination of said limited reduction in brake pipe pressure to connect said reservoir to said communication, the volume of said reservoir being such that the pressure of fluid therein will provide an increase in pressure in said communication equal to that which would be obtained by the amount of fluid pressure supplied by the said valve means during said limited reduction in brake pipe pressure.

6. In a locomotive fluid pressure brake equipment, in combination, a brake pipe, a communication to which fluid under pressure is adapted to be supplied to effect an application of locomotive brakes to a degree dependent upon the pressure of fluid in said communication, an engineer's brake valve device movable to a first service position to effect a limited reduction in brake pipe pressure and to vent said communication and movable to another service position to effect an unlimited reduction in pressure in said brake pipe and to close the vent to said communication, valve means controlled by the opposing pressures of the brake pipe and a chamber and operative upon a reduction in brake pipe pressure to supply fluid under pressure from said chamber to said communication in a quantity dependent upon the reduction in brake pipe pressure, a reservoir normally in communication with said brake pipe and charged with fluid under pressure therefrom, valve means controlling communication between said reservoir and brake pipe and operative upon movement of said brake valve device to said first service position to close said communication, other valve means operative at the termination of said limited reduction in brake pipe pressure to connect said reservoir to said communication, said reservoir being of such volume that the fluid at brake pipe pressure therein will effect an increase in pressure in said communication equal to that which would be provided by the amount of fluid pressure supplied by said valve means during said limited reduction in brake pipe pressure.

7. In a locomotive fluid pressure brake equipment, in combination, a brake pipe, a distributing valve device operable upon a reduction in pressure in said brake pipe to supply fluid under pressure to a passage at a pressure dependent upon the degree of reduction in brake pipe pressure for effecting an application of locomotive brakes to a proportional degree, an application cylinder pipe connected to said passage, an engineer's brake valve device having a first service position for effecting a limited reduction in brake pipe pressure and another service position for effecting an unlimited reduction in brake pipe pressure, said brake valve device in said first service position venting said application cylinder pipe to the atmosphere and in said other service position closing the vent to said application cylinder pipe, and means operable automatically at the termination of said limited reduction in brake pipe pressure to supply fluid under pressure to said passage in a quantity equal to that supplied by said distributing valve device during said limited reduction in brake pipe pressure.

8. In a locomotive fluid pressure brake equipment, in combination, a brake pipe, a distributing valve device operable upon a reduction in pressure in said brake pipe to supply fluid under pressure to a passage at a pressure dependent upon the degree of reduction in brake pipe pressure for effecting an application of locomotive brakes to a proportional degree, an application cylinder pipe connected to said passage, an engineer's brake valve device movable to a first service position for effecting an initial limited service reduction in brake pipe pressure and then movable to another service position for continuing the service reduction in brake pipe pressure, said brake valve device in said first service position establishing communication between said application cylinder pipe and atmosphere and in said other service position closing such communication, and valve means designed to operate at substantially the time of movement of said brake valve device from said first service position to said other service position to supply fluid under pressure to said application cylinder pipe in a quantity equal substantially to that vented through said brake valve device in said first service position during said limited reduction in brake pipe pressure.

9. In a locomotive fluid pressure brake equipment, in combination, a brake pipe, a distributing valve device having an application cylinder, and an equalizing portion operative upon a reduction in brake pipe pressure to supply fluid under pressure to said cylinder at a pressure depending upon the degree of reduction in brake pipe pressure for effecting an application of locomotive brakes to a proportional degree, an application cylinder pipe connected to said application cylinder, an engineer's automatic brake valve device having two service positions for effecting a service reduction in pressure in said brake pipe, a reduction limiting reservoir to which fluid under pressure is supplied by said brake valve device in one of said service positions for limiting the service reduction in brake pipe pressure to a chosen degree, said brake valve device in said one service position connecting said application cylinder pipe to the atmosphere and in said other service position lapping said application cylinder pipe, a compensating reservoir, valve means normally establishing communication between said compensating reservoir and brake pipe for charging said compensating reservoir with fluid at the pressure normally carried in said brake pipe and operable upon the initial supply of fluid under pressure to said reduction limiting reservoir to close communication between said compensating reservoir and brake pipe, and valve means operable automatically at the termination of said limited reduction in brake pipe pressure to connect said compensating reservoir to said application cylinder pipe, said compensating reservoir being of such volume as to provide an increase in pressure in said application cylinder equal to that which would have been obtained by the fluid pressure supplied by said equalizing portion during said limited reduction in brake pipe pressure and vented through said application cylinder pipe.

10. In a locomotive fluid pressure brake equipment, in combination, a brake pipe, valve means operative upon a reduction in brake pipe pressure to supply fluid under pressure to a communication in a quantity which varies in accordance with the degree of reduction in brake pipe pressure, an increase in pressure in said communication being operative to effect an application of locomotive brakes, an engineer's brake valve device having a first service position for effecting a limited service reduction in pressure in said brake pipe and another service position for effecting an unlimited service reduction in pressure in said brake pipe, said brake valve device in said first service position venting said comunication and in said other service position closing the vent to said communication, a compensating reservoir normally connected to said brake pipe and charged with fluid under pressure therefrom, valve means operative upon initiating a reduction in brake pipe pressure by said brake valve device in said first service position to close the connection between said reservoir and brake pipe, and other valve means operative at the termination of said limited reduction in brake pipe pressure to connect said reservoir to said communication whereupon fluid pressure in said reservoir is adapted to flow into said communication, the volume of said reservoir being such as to provide for a supply of fluid to said communication equal to that provided by said valve means during said limited reduction in brake pipe pressure, a choke arranged to restrict the flow of fluid under pressure from said reservoir to said communication, a passage of greater flow capacity than said choke by-passing same to provide for rapid charging of said resevoir with fluid under pressure from said brake pipe, and a check valve arranged to prevent flow of fluid under pressure from said reservoir through said passage.

11. In a locomotive brake equipment, in combination, a brake pipe, a distributing valve device comprising an equalizing portion adapted to operate upon a reduction in brake pipe pressure to supply fluid to a passage in a quantity proportional to the degree of reduction in brake pipe pressure, an increase in pressure in said passage being operative to effect an application of the locomotive brakes, an application cylinder pipe connected to said passage, an equalizing reservoir, a reduction limiting reservoir, an engineer's automatic brake valve device having a normal position for charging said brake pipe and equalizing reservoir with fluid under pressure and for venting said reduction limiting reservoir and being movable therefrom to a first service position for connecting said reservoirs to provide a limited reduction in pressure in said equalizing reservoir and to another service position for connecting said equalizing reservoir to the atmosphere to provide a greater reduction in pressure therein, said brake valve device venting said application cylinder pipe in said first service position and closing such vent in the other service position, an equalizing discharging valve mechanism operative in accordance with the reduction in pressure in said equalizing reservoir to provide a coresponding reduction in pressure in said brake pipe, a compensating reservoir, valve means controlled by the pressure in said reduction limiting reservoir and operative when said reduction limiting reservoir is vented to establish communication between said brake pipe and compensating reservoir for charging said compensating reservoir with fluid at brake pipe pressure, said valve means being operative upon the initial supply of fluid under pressure to said reduction limiting reservoir to close communication between said compensating reservoir and brake pipe, and delay valve means operative at the termination of the limited reduction in brake pipe pressure to establish communication between said compensating reservoir and passage to provide for equalization of pressures therein, said compensating reservoir being of such volume that the amount of fluid under pressure supplied therefrom to said passage is equal substantially to the amount of fluid supplied by said distributing valve device to said passage during said limited reduction in brake pipe pressure.

12. A modified No. 6-ET locomotive brake equipment comprising the usual distributing valve device, brake pipe, application cylinder pipe and distributing valve release pipe, which pipes are connected to said distributing valve device, said distributing valve device being operative upon a reduction in brake pipe pressure to supply fluid to an application cylinder passage open to said application cylinder pipe in a quantity proportional to the reduction in brake pipe pressure, said equipment further comprising the usual equalizing reservoir and engineer's automatic brake valve device having the usual charging, lap and service positions for controlling the pressure in said equalizing reservoir and thereby in said brake pipe, the holding position of said brake valve device being converted to a first service position, a reduction limiting means added to said equipment, the usual brake release passage in said brake valve device being disconnected from said distributing valve release pipe and connected to said reduction limiting means, said brake valve device being so modified that in said first service position said equalizing reservoir is connected to said brake release passage and thereby to said reduction limiting means to provide a limited reduction in equalizing reservoir pressure and thereby in brake pipe pressure, said brake valve device being also modified to vent said application cylinder pipe in said first service position, and valve means added to said equipment and operative automatically at the termination of said limited reduction in brake pipe pressure to supply fluid under pressure to said application cylinder passage.

13. A modified No. 6-ET locomotive brake equipment comprising the usual distributing valve device, brake pipe, application cylinder pipe and distributing valve release pipe, which pipes are connected to said distributing valve device, said distributing valve device being operative upon a reduction in brake pipe pressure to supply fluid to an application cylinder passage open to said application cylinder pipe in a quantity proportional to the reduction in brake pipe pressure, said equipment further comprising the usual equalizing reservoir and engineer's automatic brake valve device having the usual charging, lap and service positions for controlling the pressure in said equalizing reservoir and thereby in said brake pipe, the holding position of said brake valve device being converted to a first service position, a reduction limiting means added to said equipment, the usual brake release passage in said brake valve device being disconnected from said distributing valve release pipe and connected to said reduction limiting means, said brake valve device being so modified that in said first service position said equalizing reservoir is connected to said brake release passage and thereby to said reduction limiting means to provide a limited reduction in equalizing reservoir pressure and thereby in brake pipe pressure, said brake valve device being also modified to vent said application cylinder pipe in said first service position, a compensating reservoir added to said equipment, valve means added to said equipment conditionable in said charging position of said brake valve device to open a communication for supplying fluid under pressure to said compensating reservoir and operable upon movement of said brake valve device to said first service position to close said communication, and other valve means added to said equipment controlled by brake pipe pressure and operative automatically substantially at the termination of said limited reduction in brake pipe pressure to connect said compensating reservoir to said application cylinder pipe for thereby supplying fluid under pressure from said compensating reservoir to said distributing valve device for effecting operation thereof to apply the locomotive brakes, the volume of said compensating reservoir being so proportioned as to supply a quantity of fluid to said application cylinder pipe equal substantially to that supplied by said distributing valve device during said limited reduction in brake pipe pressure.

14. A modified No. 6-ET locomotive brake equipment comprising the usual distributing valve device, brake pipe, application cylinder pipe, and distributing valve release pipe, which pipes are connected to said distributing valve device, said distributing valve device being operative upon a reduction in brake pipe pressure to supply fluid under pressure to an application cylinder passage open to said application cylinder pipe in a quantity proportional to the reduction in brake pipe pressure, said equipment further comprising the usual feed valve device, equalizing reservoir, and engineer's automatic brake valve device having the usual charging, lap and service positions for charging said brake pipe and reservoir with fluid under pressure from said feed valve device and for venting fluid under pressure from said reservoir to effect a corresponding venting of fluid under pressure from said brake pipe, the holding position of said brake valve device being converted to a first service position, a reduction limiting reservoir added to said equipment, the usual locomotive brake release passage in said brake valve device being disconnected from said distributing release valve release pipe and connected to said reduction limiting reservoir, said brake valve device being so modified that in said first service position said equalizing reservoir is connected to said reduction limiting reservoir to provide a limited reduction in pressure in said equalizing reservoir and thereby in said brake pipe, and also in said first service position said brake valve device venting said application cylinder pipe, a compensating reservoir added to said equipment, a delay valve device controlled by the opposing pressures of fluid supplied by said feed valve device and in said brake valve, valve means controlled by the pressure of fluid in said reduction limiting reservoir, said valve means being operative when said reduction limiting reservoir is vented in the charging position of said brake valve device to establish communication between said brake pipe and compensating reservoir for charging said compensating reservoir with fluid under pressure, and being operative upon the initial supply of fluid under pressure to said reduction limiting reservoir in first service position of said brake valve device to close communication between said compensating reservoir and brake pipe and to connect said compensating reservoir to said delay valve device, said delay valve device being automatically operative by feed valve pressure at the termination of said limited reduction in brake pipe pressure to connect said compensating reservoir to said application cylinder pipe to provide for equalization of the fluid pressure in said compensating reservoir into said application cylinder pipe and application cylinder passage in said distributing valve device, said compensating reservoir being of such volume as to provide a quantity of fluid in said application cylinder pipe and passage equal substantially to that supplied by said distributing valve device for effecting an application of locomotive brakes during said limited reduction in brake pipe pressure.

CLYDE C. FARMER.